Dec. 16, 1958 A. J. W. M. VAN OVERBEEK 2,864,902

AMPLIFYING CIRCUIT COMPRISING A PLURALITY OF TRANSISTORS

Filed April 8, 1954

INVENTOR
ADRIANUS JOHANNES WILHELMUS
MARIE VAN OVERBEEK
BY Fred M Vogel
AGENT

United States Patent Office 2,864,902

Patented Dec. 16, 1958

2,864,902

AMPLIFYING CIRCUIT COMPRISING A PLURALITY OF TRANSISTORS

Adrianus Johannes Wilhelmus Marie van Overbeek, Eindhoven, Netherlands, assignor, by mesne assignments, to North American Philips Company, Inc., New York, N. Y., a corporation of Delaware Application April 8, 1954, Serial No. 421,931

Claims priority, application Netherlands April 29, 1953

3 Claims. (Cl. 179—171)

This invention relates to amplifying circuits comprising the cascade of a plurality of current-amplifying transistors in grounded-base connection whilst avoiding coupling transformers between the transistors of the cascade.

The term "grounded-base connection" is to be understood here to mean that the base electrode of the transistor concerned is connected, if desired with the interposition of a so-called base impedance, to a terminal of a source of supply, its input circuit being constituted by the circuit between the said terminal and the emitter electrode and its output circuit being constituted by the circuit between the said terminal and the collector electrode.

A circuit-arrangement of the kind specified above is described, for example, by Ryder and Kircher in B. S. T. J., July 1949, pages 367 to 400. As appears from page 384 in the last paragraph but one of the said article, the amplification per stage as determined by the value $\alpha$ is relatively low. A circuit of the type described normally produces a current amplification per stage $\alpha$, where $\alpha$ is defined as the relationship between the variation in the current flowing to the collector electrode of the transistor and the variation in the current flowing to the emitter electrode at unvaried voltages at these electrodes.

The invention provides means which permit of obtaining, for example, 2 to 3 times higher current amplification per transistor stage. It is characterized in that for the purpose of increasing the amplification factor a parallel impedance $r_p$ is inclued between the coupling lead connecting the collector electrode of one transistor to the emitter electrode of the subsequent transistor of the cascade and the coupling lead between the base electrodes of the said transistors, which parallel impedance satisfies the equations $$r_p=K(\alpha r_b-r_b-r_e)$$

and $r_p$ smaller than ⅓ $r_m$, wherein K is a constant greater than 1.2 and less than 3, $\alpha$=the current-amplification factor, $r_b$=the total base impedance, $r_e$=the total emitter impedance and $r_m$=the transmission impedance of the transistors.

Figure 1:
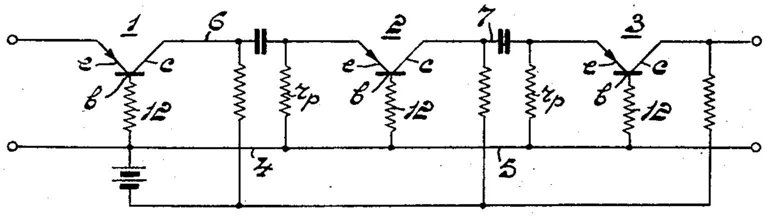
Figure 2:
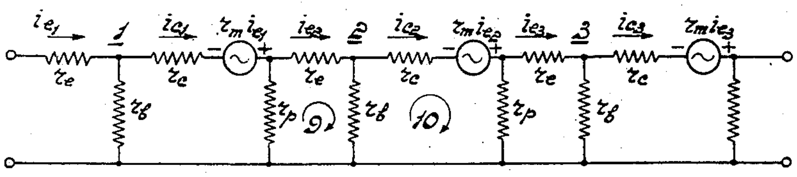

In order that the invention may be readily carried into effect, it will now be described with reference to the accompanying drawing, given by way of example, in which Fig. 1 shows one embodiment of the invention and Fig. 2 shows a substitution diagram of the circuit-arrangement of Fig. 1.

The amplifying circuit shown in Fig. 1 comprises the cascade of a plurality of current-amplifying transistors 1, 2, 3, for example, point-contact transistors, each comprising an emitter electrode *e*, a base electrode *b* and a collector electrode *c*. The base electrodes *b* of the transistors 1, 2 and 3 are connected to a common conductor system 4—5 through base resistors shown as 12. The collector electrode *c* of transistor 1 is connected to the emitter electrode *e* of transistor 2 through a signal conductor system 6 which includes a coupling capacitor and the collector electrode *c* of transistor 2 is connected to the emitter electrode *e* of transistor 3 through a signal conductor system 7 which similarly includes a coupling capacitor.

According to the invention, the conductor systems 6 and 7 are interconnected to the conductor systems 4 and 5, respectively, by way of comparatively small impedances $r_p$ in accordance with the above-described proportioning instruction. On the basis of the said known circuit-arrangement, in which the impedances $r_p$ are high, one would expect at first sight that a decrease in the value of impedances $r_p$ would lead to a shunting effect diminishing the gain of the amplifier system. However, as will appear from the calculation following hereinafter, which is confirmed by experiments, an increased current-amplification per stage is affirmed.

In Fig. 2, the transistors 1, 2 and 3 are replaced in the usual manner by a T-connection of impedances $r_e$ (emitter impedance), $r_c$ (collector impedance) and $r_b$ (base impedance) and voltage sources $r_m i_e$, where $r_m$ indicates the transmission (mutual) impedance and $i_e$ represents the current flowing to the emitter electrode *e* of the transistor concerned. If the current flowing to the collector electrode *c* of each transistor is indicated by $i_c$ then the following equations result by the use of the Kirchhoff law in the loops 9 and 10

$$-i_{c1}r_p+i_{e2}(r_p+r_e+r_b)-i_{c2}r_b=0$$
$$-i_{e2}r_b+i_{c2}(r_b+r_c+r_p)-i_{e3}r_p=i_{e2}r_m \qquad (1)$$

When, furthermore, the amplification per stage is assumed to be *n*, then $$i_{c2}=ni_{c1}$$

and $$i_{e3}=ni_{e2} \qquad (2)$$

After substituting $i_{c1}$ and $i_{e3}$ according to (2) in the above-mentioned Equations 1 we can eliminate $i_{e2}$ and $i_{c2}$ and find $$(r_p+r_e+r_b)(r_b+r_c+r_p)=\left(r_b+\frac{r_p}{n}\right)(r_m+r_b+nr_p) \qquad (3)$$

or $$n^2\cdot r_b r_p-n(r_e r_p+2r_b r_p+r_c r_p+r_b r_c+r_b r_e+r_e r_c-r_b r_m)+r_p(r_m+r_b)=0 \qquad (4)$$

When *n* is resolved therefrom and the quadrate of the coefficient of *n* is assumed to be great with respect to the 4-fold of the product of the coefficient of $n^2$ with the constant term in the above-mentioned equation, we find $$n=\sim\frac{r_m+r_b}{r_e+r_c+2r_b+\Delta/r_p} \qquad (5)$$

wherein $$\Delta=r_b r_c+r_b r_e+r_e r_c-r_b r_m \qquad (6)$$

or $$\frac{1}{n}=\frac{1}{\alpha}\left(1-\frac{\alpha r_b-r_b-r_e}{r_p}\right)+\frac{r_e+r_b}{r_m+r_b} \qquad (7)$$

wherein the current-amplification factor $$\alpha=\frac{r_m+r_b}{r_c+r_b} \qquad (8)$$

The last term in Equation 7 is commonly negligible, since $r_e+r_b$ is small with respect to $r_m$. It appears now that, if $r_p$ is comparatively high as is the case in the above-mentioned publication, $n=\alpha$, whereas, if according to the invention $$r_p=K(\alpha r_b-r_b-r_e) \qquad (9)$$

where K is a constant greater than 1.2 and less than 3, a considerably higher value of *n* is found. In this connection it is to be noted that self-oscillation occurs at a value of K smaller than 1.

For fulfilling the Equation 9 use may be made of transistors which by nature have a value of $r_b$ such that the above-mentioned Expression 6 for $\Delta$ becomes negative. However, in order to be less dependent upon any variation occurring in the transistor, an additional resistor 12 is commonly included in series in the base circuit of each transistor, which thus remarkably has a stabilising influence and the value of which is to be calculated in the value of $r_b$ in the above-mentioned equations. The total value of the resistors $r_b$ and $r_e$ must, as before, be very small with respect to $r_m$, which may be ensured by the condition that $r_p$ is smaller than 1/5 $r_m$. The circuit thus obtained is found to be very stable.

If desired, the resistor 12 may also serve as is well-known, to produce the biassing potential required for the emitter electrodes of the transistors such as shown in Fig. 1.

What is claimed is:

1. A multistage transistor amplifier comprising a plurality of transistor amplifying stages in grounded base connection, each of said stages comprising a transistor having an emitter electrode, a collector electrode and a base electrode, a first electrical conductor system connecting the collector electrode of a first of said transistors to the emitter electrode of the next succeeding second transistor, a second electrical conductor system connecting the base electrode of said first transistor to the base electrode of said second transistor, an impedance element connected between said first conductor system and said second conductor system, said impedance element having a value defined by the equations $$r_p = K(\alpha r_b - r_b - r_e)$$
$$r_p < 0.2 r_m$$

where:

K is a constant greater than 1.2 but less than 3,
$\alpha$ is the current amplification factor,
$r_b$ is the total base impedance in ohms,
$r_e$ is the total emitter impedance in ohms, and
$r_m$ is the transmission impedance of the transistors in ohms.

2. A multistage transistor amplifier as claimed in claim 1, further comprising impedance elements each connected between the base electrodes of said first and second transistors in said second conductor system.

3. A multistage transistor amplifier comprising a plurality of transistor amplifying stages in grounded base connection, each of said stages comprising a transistor having an emitter electrode, a collector electrode and a base electrode, a first electrical conductor system comprising a capacitor connecting the collector electrode of a first transistor to the emitter electrode of the next succeeding second transistor, a second electrical conductor system connecting the base electrode of said first transistor to the base electrode of said second transistor, an input signal source connected between the emitter electrode and the base electrode of the first transistor, means coupled to the collector electrode of said second transistor for deriving therefrom an amplified signal, an impedance connected between the base electrodes of said first and second transistors in said second conductor system, an impedance element connected between said first conductor system and said second conductor system, said impedance element having a value defined by the equations $$r_p = K(\alpha r_b - r_b - r_e)$$
$$r_p < 0.2 r_m$$

where:

K is a constant greater than 1.2 but less than 3,
$\alpha$ is the current amplification factor,
$r_b$ is the total base impedance in ohms,
$r_e$ is the total emitter impedance in ohms, and
$r_m$ is the transmission impedance of the transistors in ohms.

References Cited in the file of this patent

UNITED STATES PATENTS

| | | |
|---|---|---|
| 2,541,322 | Barney | Feb. 13, 1951 |
| 2,544,211 | Barton | Mar. 6, 1951 |
| 2,652,460 | Wallace | Sept. 15, 1953 |